United States Patent
Harish et al.

(10) Patent No.: US 7,343,814 B2
(45) Date of Patent: Mar. 18, 2008

(54) MULTI-ZONE CAPACITIVE FORCE SENSING DEVICE AND METHODS

(75) Inventors: Divyasimha Harish, Union City, CA (US); William D. Dallenbach, Sunnyvale, CA (US); King Wong, Saratoga, CA (US); John Schultz, Santa Clara, CA (US)

(73) Assignee: Loadstar Sensors, Inc., Mountain View, CA (US)

( * ) Notice: Subject to any disclaimer, the term of this patent is extended or adjusted under 35 U.S.C. 154(b) by 24 days.

(21) Appl. No.: 11/397,507

(22) Filed: Apr. 3, 2006

(65) Prior Publication Data
US 2007/0227257 A1    Oct. 4, 2007

(51) Int. Cl.
*G01B 7/16* (2006.01)
(52) U.S. Cl. ............................. 73/780; 73/718; 73/777; 73/862.625; 73/862.626
(58) Field of Classification Search .................. 73/718, 73/777, 780, 862.625, 862.626
See application file for complete search history.

(56) References Cited

U.S. PATENT DOCUMENTS

| | | | |
|---|---|---|---|
| 3,336,525 A | 8/1967 | Church | |
| 3,646,433 A | 2/1972 | Eilersen | |
| 3,698,249 A | 10/1972 | Weaver | |
| 3,859,575 A | 1/1975 | Lee et al. | |
| 3,880,008 A | 4/1975 | Eilersen | |
| 4,042,876 A | 8/1977 | Visioli, Jr. | |
| 4,054,833 A | 10/1977 | Briefer | |
| 4,084,438 A | 4/1978 | Lee | |
| 4,093,915 A | 6/1978 | Briefer | |
| 4,175,428 A | 11/1979 | Eilersen | |
| 4,227,418 A | 10/1980 | Bonner et al. | |
| 4,229,776 A | 10/1980 | Antikainen et al. | |
| 4,358,814 A | 11/1982 | Lee et al. | |

(Continued)

FOREIGN PATENT DOCUMENTS

| | | |
|---|---|---|
| CH | 0409439 | 3/1966 |
| DE | 2514511 | 10/1975 |
| DE | 3718292 A1 | 10/1987 |
| DE | 4330808 | 3/1995 |
| DE | 4420691 | 1/1996 |

(Continued)

OTHER PUBLICATIONS

"Eilersen Electric Digital Weighing Systems", http://www.eilersen.com/, 1 pg, Jun. 15, 2006.

(Continued)

*Primary Examiner*—Edward Lefkowitz
*Assistant Examiner*—Freddie Kirkland, III
(74) *Attorney, Agent, or Firm*—Raj Abhyanker, LLP (57) ABSTRACT

A multi-zone capacitive force sensing apparatus/method is disclosed. In one embodiment, an apparatus includes one or more capacitors each having an upper conductive surface and a lower conductive surface substantially parallel to the upper conductive surface, a housing with a top plate and a bottom plate to encompass the capacitors, and a sensor in the housing to generate a measurement based on a change in a distance between the upper conductive surface and the lower conductive surface of each of the capacitors when a contact zone of the top plate associated with the each of the plurality of capacitors is deflected by a force applied on the contact zone. The apparatus may also include a comparison module associated with the sensor to generate a signal indicating unevenness of a force applied on the top plate when there is any significant difference between measurements of the capacitors.

21 Claims, 10 Drawing Sheets

MULTI-ZONE CAPACITIVE FORCE-MEASURING DEVICE 100

U.S. PATENT DOCUMENTS

| | | | |
|---|---|---|---|
| 4,370,697 A * | 1/1983 | Haberl et al. | 361/283.1 |
| 4,382,479 A | 5/1983 | Lee et al. | |
| 4,383,586 A | 5/1983 | Lee | |
| 4,386,312 A | 5/1983 | Briefer | |
| 4,433,742 A | 2/1984 | Lee | |
| 4,434,203 A | 2/1984 | Briefer | |
| 4,434,451 A | 2/1984 | Delatorre | |
| 4,448,085 A | 5/1984 | Lee | |
| 4,463,614 A | 8/1984 | Lee | |
| 4,464,725 A | 8/1984 | Briefer | |
| 4,513,831 A | 4/1985 | Lee et al. | |
| 4,558,600 A | 12/1985 | Lee | |
| 4,603,308 A | 7/1986 | Briefer | |
| 4,649,759 A * | 3/1987 | Lee | 73/862.626 |
| 4,846,293 A | 7/1989 | Li | |
| 4,899,600 A | 2/1990 | Lee | |
| 4,949,054 A | 8/1990 | Briefer | |
| 4,961,055 A * | 10/1990 | Habib et al. | 324/662 |
| 5,023,966 A | 6/1991 | Eilersen | |
| 5,024,099 A | 6/1991 | Lee | |
| 5,078,220 A | 1/1992 | Briefer | |
| 5,115,676 A | 5/1992 | Lee | |
| 5,150,275 A | 9/1992 | Lee et al. | |
| 5,194,819 A | 3/1993 | Briefer | |
| 5,302,894 A | 4/1994 | Hrubes | |
| 5,442,962 A | 8/1995 | Lee | |
| 5,542,300 A | 8/1996 | Lee | |
| 5,604,315 A | 2/1997 | Briefer et al. | |
| 5,705,751 A | 1/1998 | Briefer et al. | |
| 5,798,462 A | 8/1998 | Briefer et al. | |
| 5,939,639 A | 8/1999 | Lethbridge | |
| 6,014,800 A | 1/2000 | Lee | |
| 6,019,002 A | 2/2000 | Lee | |
| 6,079,282 A * | 6/2000 | Lanter | 73/862.626 |
| 6,180,892 B1 | 1/2001 | Li | |
| 6,191,722 B1 | 2/2001 | Briefer | |
| 6,205,861 B1 | 3/2001 | Lee | |
| 6,257,068 B1 | 7/2001 | Briefer et al. | |
| 6,316,948 B1 | 11/2001 | Briefer | |
| 6,496,019 B1 | 12/2002 | Briefer | |
| 6,513,388 B1 * | 2/2003 | Oja et al. | 73/777 |
| 6,532,834 B1 | 3/2003 | Pinto et al. | |
| 6,718,827 B1 | 4/2004 | Lee et al. | |
| 6,779,408 B2 * | 8/2004 | Okada | 73/862.043 |
| 6,789,429 B2 | 9/2004 | Pinto et al. | |
| 6,809,529 B2 * | 10/2004 | Okada et al. | 324/681 |
| 6,823,747 B2 * | 11/2004 | Hasegawa et al. | 73/862.52 |
| 6,989,677 B2 * | 1/2006 | Morimoto | 324/660 |
| 7,047,818 B2 * | 5/2006 | Dallenbach et al. | 73/780 |
| 7,187,185 B2 * | 3/2007 | Dallenbach et al. | 324/662 |
| 2004/0159158 A1 * | 8/2004 | Forster | 73/718 |
| 2005/0061082 A1 * | 3/2005 | Dallenbach et al. | 73/780 |
| 2005/0066742 A1 | 3/2005 | Eilersen | |
| 2005/0132820 A1 | 6/2005 | Eilersen | |
| 2006/0065973 A1 * | 3/2006 | Dallenbach et al. | 257/712 |
| 2006/0066319 A1 * | 3/2006 | Dallenbach et al. | 324/662 |
| 2006/0096384 A1 * | 5/2006 | Harish et al. | 73/780 |
| 2006/0267321 A1 * | 11/2006 | Harish et al. | 280/735 |

FOREIGN PATENT DOCUMENTS

| | | |
|---|---|---|
| EP | 0074574 A1 | 3/1983 |
| EP | 0131024 B1 | 10/1986 |
| EP | 0335385 A3 | 10/1989 |
| EP | 0340190 A1 | 11/1989 |
| EP | 0412926 A1 | 2/1991 |
| EP | 0412926 B1 | 2/1991 |
| EP | 0431067 A4 | 6/1991 |
| EP | 0438413 A4 | 7/1991 |
| EP | 0340190 B1 | 7/1992 |
| EP | 0500783 A4 | 9/1992 |
| EP | 0438413 B1 | 3/1993 |
| EP | 0714505 A4 | 6/1996 |
| EP | 0500783 B1 | 10/1996 |
| EP | 0741906 A4 | 11/1996 |
| EP | 0830577 A4 | 3/1998 |
| EP | 0969287 A2 | 1/2000 |
| EP | 0741906 B1 | 6/2000 |
| EP | 1038161 A4 | 9/2000 |
| EP | 0714505 B1 | 2/2001 |
| EP | 1117052 A1 | 7/2001 |
| EP | 0969287 A3 | 1/2003 |
| EP | 1038161 B1 | 5/2003 |
| EP | 1386173 B1 | 10/2004 |
| EP | 1451538 B1 | 8/2005 |
| FR | 2102161 | 7/1972 |
| JP | 56114404 A | 9/1981 |
| JP | 59022404 A | 2/1984 |
| JP | 61077733 | 4/1986 |
| WO | WO-8402780 A1 | 7/1984 |
| WO | WO-02075331 A1 | 9/2002 |
| WO | WO-02077593 A1 | 10/2002 |
| WO | WO-03048700 A2 | 6/2003 |
| WO | WO-03048700 A3 | 6/2003 |

OTHER PUBLICATIONS

"Model MCL Internally Amplified Miniature Tension/Compression Load Cell", http://www.rdpelectrosense.com/load/mcl.htm, 3 pages, Sep. 27, 2005.

"Weighing Systems: Scales, Balances and Load Cells:Setra", *Setra Weighing Systems Division:* http://www.setra.com/wei/index.htm, 2 Pages, Sep. 26, 2007.

* cited by examiner

MULTI-ZONE CAPACITIVE FORCE SENSING DEVICE AND METHODS

FIELD OF TECHNOLOGY

This disclosure relates generally to technical fields of measuring devices and, in one embodiment, to a multi-zone capacitive force sensing apparatus and method.

BACKGROUND

A force-measuring device may be used to gauge a force (e.g., a load) applied on the force-measuring device, and may generate a single measurement associated with the force. For example, the force-measuring device could be placed underneath an object being gauged (e.g., weighed) to measure the force of the object being applied on the force-measuring device.

However, the single measurement generated by the force-measuring device may not be sufficient to determine a levelness of the object. A number of the force-measuring device (e.g., at least two) may be needed to measure the levelness of the object. For example, a load being exerted over four force-measuring devices (e.g., which may be symmetrically and/or strategically placed) may be determined to be even (e.g., balanced) when measurements generated by the four force-measuring devices indicate no significant difference between them. In the example, a use of the four force-measuring devices to measure a balance of the load may incur an extra expense to procure (e.g., buy, rent, etc.) the four force-measuring devices. In addition, more accessories (e.g., cables, data processing system, communication device, etc.) may be needed to read, process, analyze, and/or generate the measurements of the four force-measuring devices.

Furthermore, a process associated with the measurements may be more technically challenging because a user employing multiple force-measuring devices may have to coordinate a process of harvesting (e.g., collecting, communicating, reading, comparing, analyzing, etc.) measurements of the multiple force-measuring devices. Thus, a complex algorithm (e.g., software and/or hardware) may be additionally required to perform the harvesting. Moreover, the measurements of the multiple force-measuring devices may be more error prone because the measurements would be harvested by the multiple force-measuring devices each with an error of its own and/or other peripheral devices. Besides, more spaces (e.g., for the multiple force-measuring devices) may be needed to position the multiple force-measuring devices before the measurements take place.

SUMMARY

A multi-zone capacitive force sensing apparatus/method is disclosed. In one aspect, an apparatus includes one or more capacitors each having an upper conductive surface and a lower conductive surface substantially parallel to the upper conductive surface, a housing with a top plate and a bottom plate to encompass the capacitors, and a sensor in the housing to generate a measurement based on a change in a distance between the upper conductive surface and the lower conductive surface of each of the capacitors when a contact zone of the top plate associated with each of the capacitors is deflected by a force applied on the contact zone. For instance, three capacitors in the housing may form a three zone sensor to generate the measurement associated with one or more of the three capacitors. The apparatus may also include a reference capacitor having an upper reference surface and a lower reference surface in the housing to compensate an error in the measurement based on an environmental condition (e.g., humidity, temperature, etc.).

The apparatus may further include one or more contact zone cavities (e.g., approximately $2/1000$ inch in depth) created on a bottom surface of the top plate to form the upper conductive surface on each of the contact zone cavities, and/or one or more bottom cavities (e.g., approximately $2/1000$ inch in depth) created on a top surface of the bottom plate to form the lower reference surface on each of the bottom cavities. In addition, the apparatus may include a single printed circuit board (PCB) to accommodate the sensor and/or one or more circuits associated with the sensor to provide the lower conductive surface of the each of the capacitors and the upper reference surface of the reference capacitor.

Furthermore, the apparatus may include a comparison module associated with the sensor to generate a signal data indicating unevenness of a force applied on the top plate when there is any significant difference (e.g., which may be a threshold value provided by a user) between measurements of the capacitors. The apparatus may also include an alarm module associated with the sensor to express a sensory data when a parameter of the signal data exceeds the threshold value, an aggregation module associated with the sensor to sum up the measurement of each of the capacitors, a capacitance-to-frequency converter module associated with the sensor to convert the measurement to a frequency value, and/or a communication module and a data processing module associated with the sensor to interface with a communication device.

In another aspect, a method includes producing a deflection in each of contact zones connected to a top plate of a housing which encompasses one or more capacitors each having two parallel conductive surfaces when a load is applied on the top plate of the housing, and automatically generating a capacitance data from each of the capacitors when a distance between the two parallel conductive surfaces of each of the capacitors is changed due to the deflection in the each of the contact zones. The method may also include proportionally converting the capacitance data to a frequency data (e.g., where the frequency data is possibly modulated to a high value), comparing the capacitance data to determine a levelness of the load applied on the top plate of the housing, and/or generating an alarm sound when the capacitance data is not substantially equal across the capacitors.

The method may further include measuring one or more forces using a sensor having one or more capacitors when the forces are applied on the contact zones, modifying one or more attributes of the housing to change a deflection characteristic of the contact zones, and/or creating a cavity on a bottom surface of the top plate opposite to each of the contact zones to form an upper conductive surface of the two parallel conductive surfaces.

The method may be executed in a form of a machine-readable medium embodying a set of instructions that, when executed by a machine, cause the machine to perform any of the operation disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the description that follows.

DETAILED DESCRIPTION

A multi-zone capacitive force sensing apparatus/method is disclosed. In the following description, for purposes of explanation, numerous specific details are set forth in order to provide a thorough understanding of the various embodiments. It will be evident, however, to one skilled in the art that the various embodiments may be practiced without these specific details. In an example embodiment, an apparatus includes a plurality of capacitors each having an upper conductive surface and a lower conductive surface substantially parallel to the upper conductive surface, a housing (e.g., in a variety of shapes including a cylinder) with a top plate and a bottom plate to encompass the capacitors, and a sensor in the housing to generate a measurement (e.g., of capacitance, voltage, and/or frequency) based on a change in a distance between the upper conductive surface and the lower conductive surface of each of the capacitors when a contact zone of the top plate is deflected by a force applied on the contact zone. A reference capacitor may be used to adjust the measurement based on one or more environmental conditions.

In addition, in another embodiment, a method includes producing a deflection in each of a plurality of contact zones coupled to a top plate of a housing which encompasses a plurality of capacitors each having two parallel conductive surfaces when a load is applied on the top plate of the housing, and automatically generating a capacitance data from each of the plurality of capacitors when a distance between the two parallel conductive surfaces of each of the plurality of capacitors is changed due to the deflection in the each of the plurality of contact zones. Also, the method may be in a form of a machine-readable medium embodying a set of instructions that, when executed by a machine, cause the machine to perform any method disclosed herein. Example embodiments of a method and an apparatus, as described below, may be used to provide a high-accuracy, low-cost, and high-longevity force measuring device (e.g., load sensors, pressure sensors, etc.). It will be appreciated that the various embodiments discussed herein may/may not be the same embodiment, and may be grouped into various other embodiments not explicitly disclosed herein.

Figure 1:
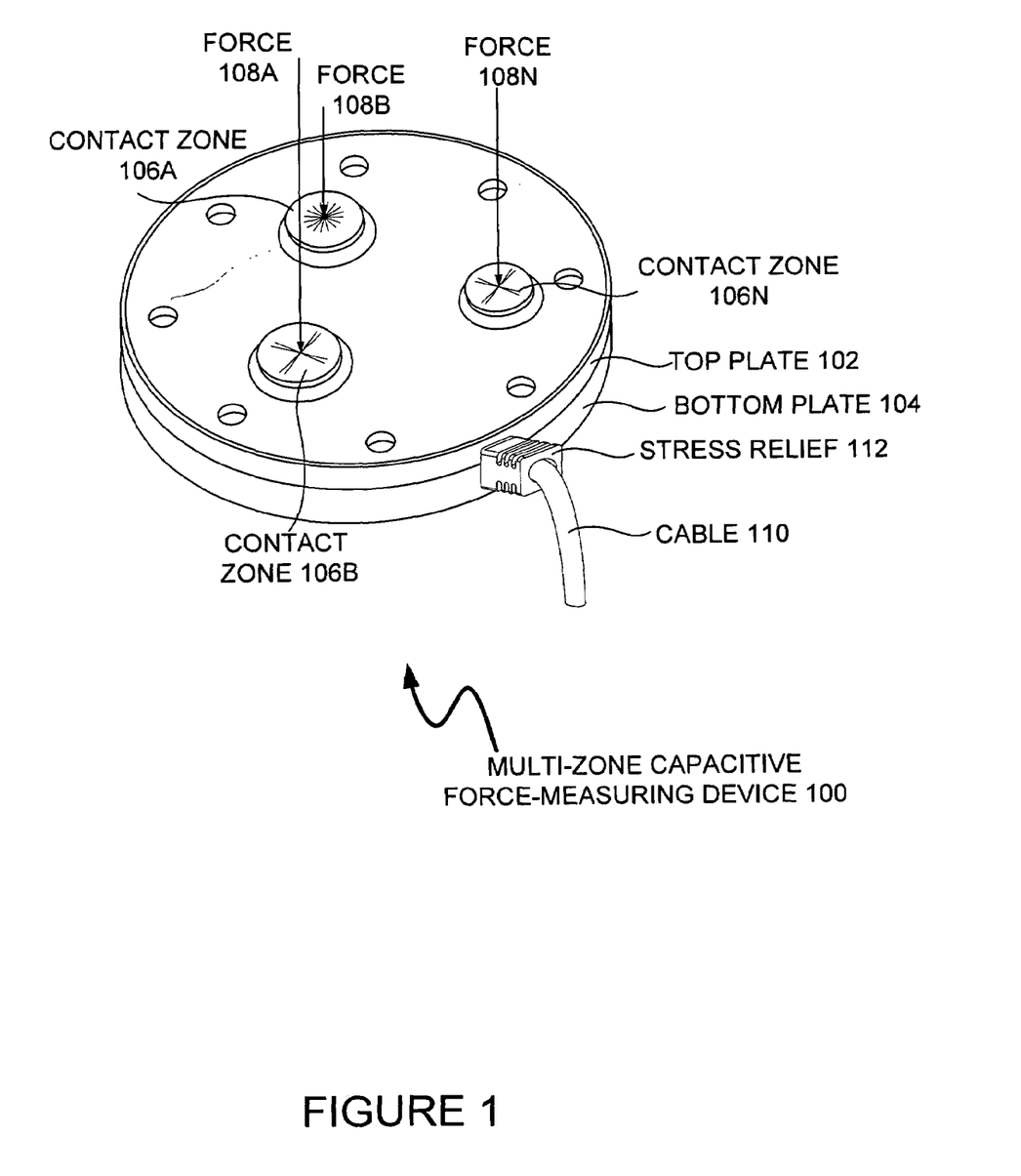
FIG. 1 is a three-dimensional view of a multi-zone capacitive force-measuring device having at least one sensor capacitor and a reference capacitor, according to one embodiment.
Figure 2:
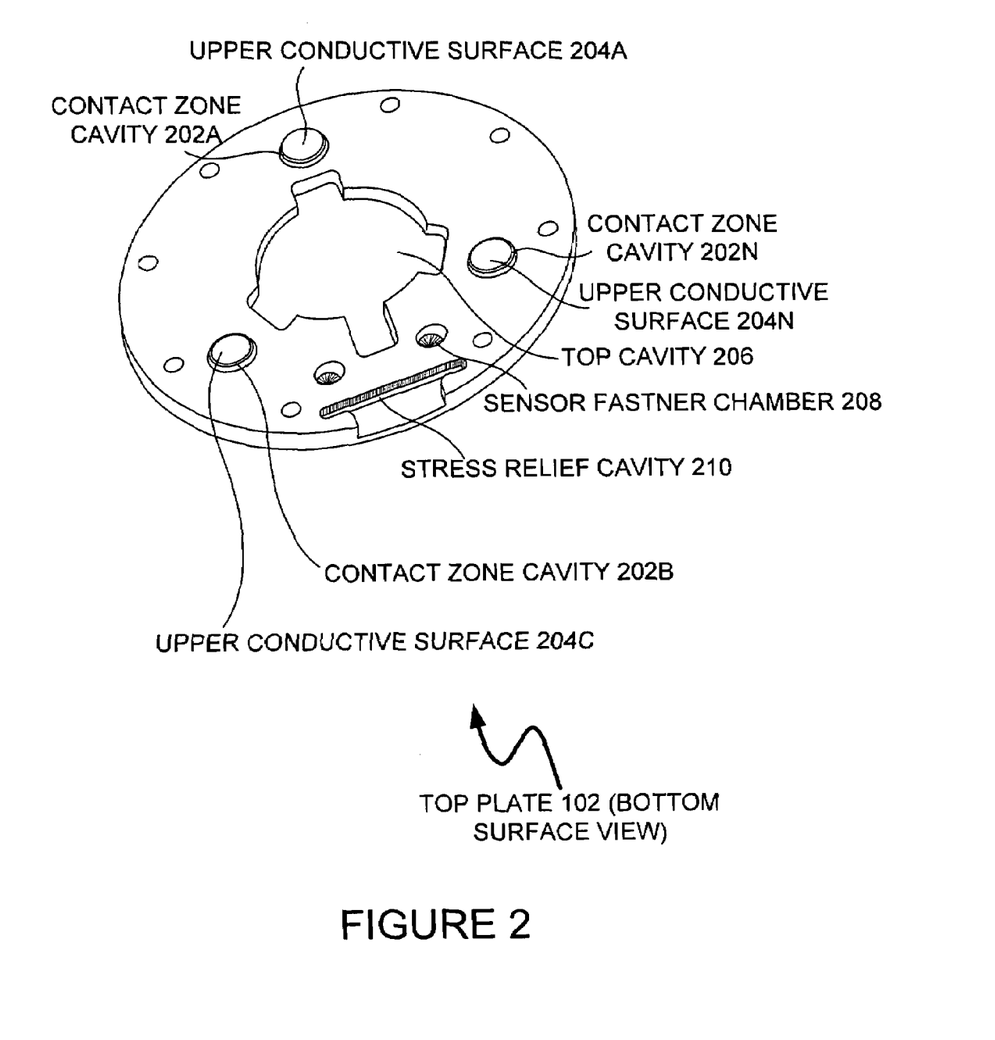
FIG. 2 is a three-dimensional view of a bottom surface of the top plate of FIG. 1, according to one embodiment.
Figure 3A:
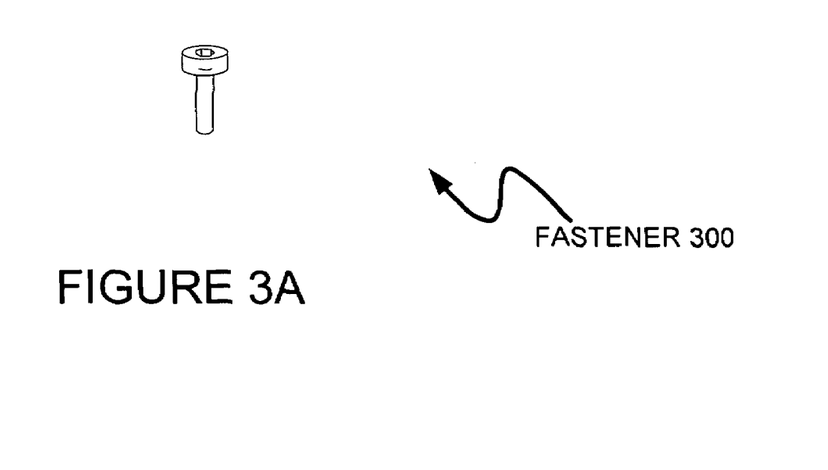
FIGS. 3A and 3B are exploded views of a fastener and a PCB which sits on a bottom cavity of FIG. 4, according to one embodiment.
Figure 3B:
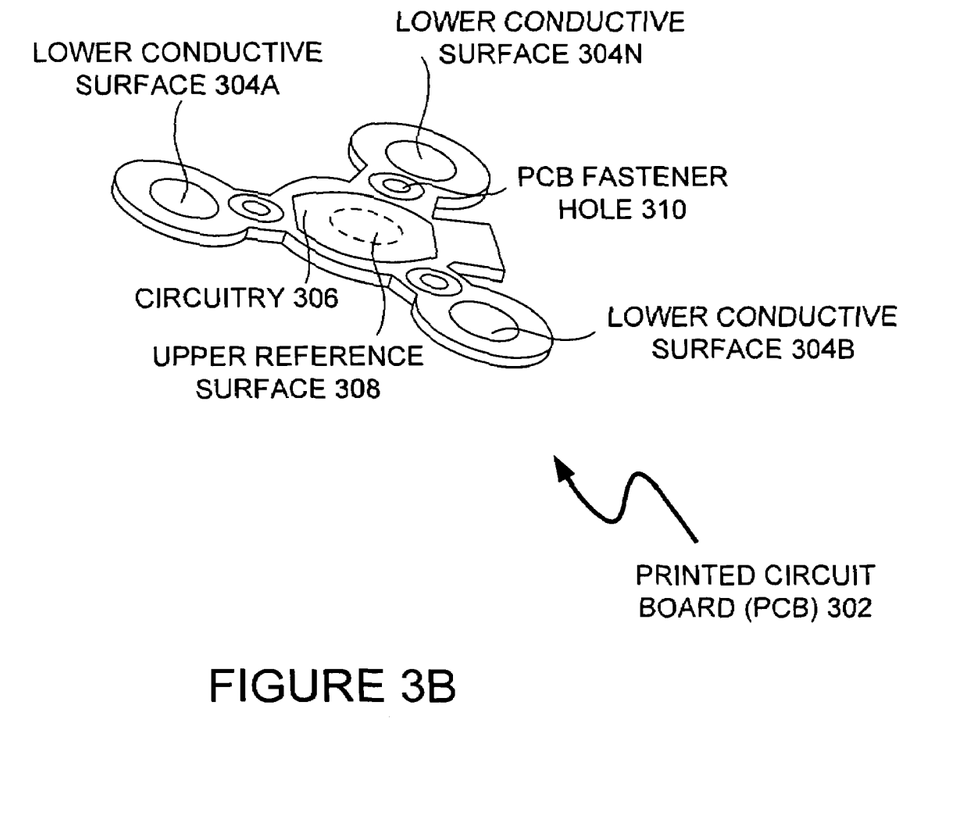
Figure 4:
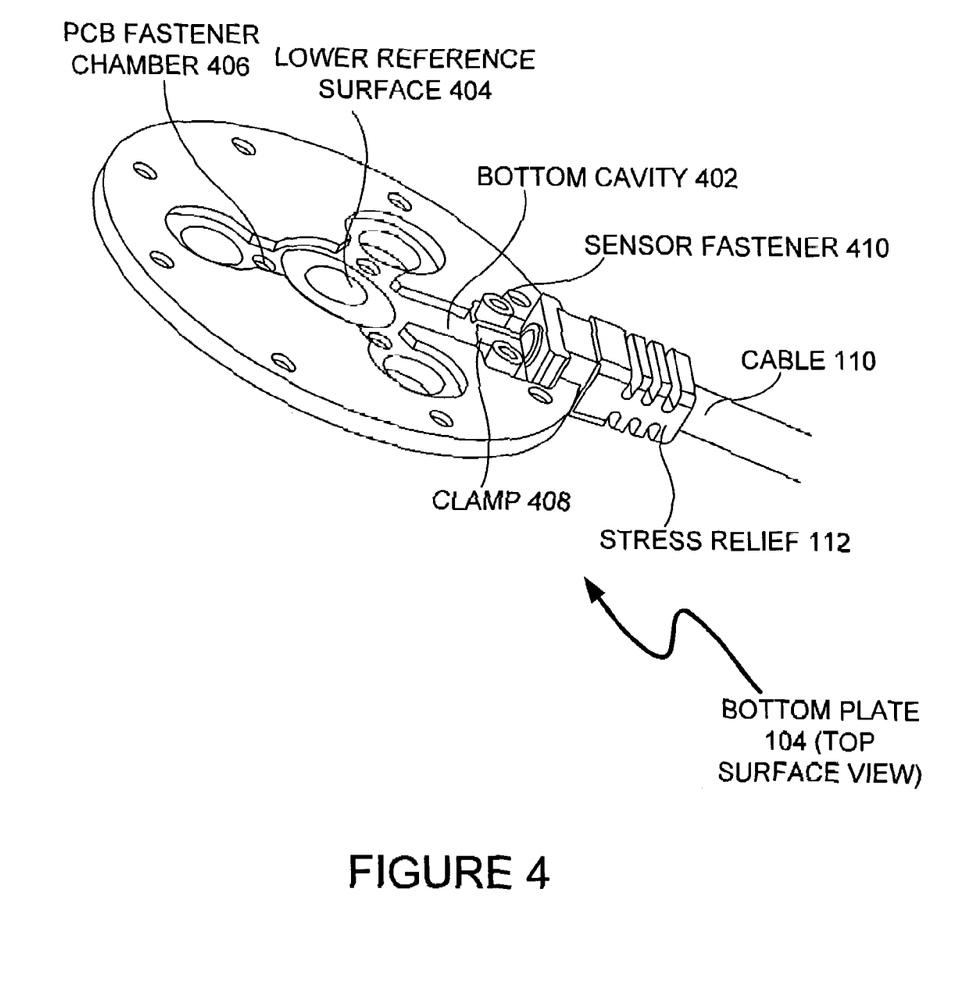
FIG. 4 is a three-dimensional view of the bottom plate having the lower reference surface, according to one embodiment.

FIG. 1 is a three-dimensional view of a multi-zone capacitive force-measuring device 100 having at least one sensor capacitor (e.g., a sensor capacitor comprising an upper conductive surface 204 of FIG. 2 and a lower conductive surface 304 of FIG. 3) and a reference capacitor (e.g., a reference capacity comprising an upper reference surface 308 of FIG. 3 and a lower reference surface 404 of FIG. 4), according to one embodiment. The multi-zone capacitive force-measuring device 100 includes a top plate 102, a bottom plate 104, a contact zone 106, a cable 110, and a stress relief 112 (e.g., made of plastic, elastomeric material, etc.). As illustrated in FIG. 1, the contact zone 106 may provide a substantial contact surface for a force (e.g., a force 108) being applied on the multi-zone capacitive force-measuring device 100. The cable 110 may be used to harvest (e.g., read, analyze, process, communicate, etc.) a measurement of the sensor capacitor where the stress relief 112 may be used to promote longevity of the cable 110 by absorbing a stress (e.g., shock, strain, etc.) applied on the cable 110.

In one example embodiment, the force 108 (e.g., a load, a weight, a pressure, etc.) may be applied on each of the contact zone 106 of the multi-zone capacitive force-measuring device 100. For instance, multiple forces 108A-N may be applied on contact zones 106A-N (e.g., which corresponds to the number of the multiple forces 108A-N). The contact zones 106A-N deflected by the multiple forces 108A-N may move down an upper conductive surface 204 of FIG. 2 of the sensor capacitor toward a lower conductive surface 304 of FIG. 3 of a printed circuit board (PCB) 302 producing a change in capacitance. In another embodiment, a housing (e.g., which may include the top plate 102, the bottom plate 104, the contact zone 106, and/or a different structure) may be made of a conductive and/or a nonconductive material. In case the nonconductive material is being used, the nonconductive material may be painted (e.g., sputtered, coated, etc.) with the conductive material. The various components of the multi-zone capacitive force-measuring device 100 may be best understood with reference to FIGS. 2-5.

FIG. 2 is a three dimensional view of a bottom surface of the top plate 102 of FIG. 1, according to one embodiment. The top plate 102 includes a contact zone cavity 202, an upper conductive surface 204, a top cavity 206, a sensor fastener chamber 208, and a stress relief cavity 210. The contact zone cavity 202 may be an indented space (e.g., of approximately 2/1000 inch in depth) on a bottom surface of the top plate 102 which lies directly opposite to the contact zone 106 of FIG. 1 across the top plate 102. The contact zone cavity 202 may be formed using a variety of methods (e.g., drilling, milling, etching, turning, marking out, welding, hand-fabrication, grinding, etc.). Accordingly, N number of contact zone cavities (e.g., contact zone cavities 202 A-N) may be formed on the bottom surface of the top plate 102 when there is N number of contact zones (e.g., contact zones 106 A-N of FIG. 1).

The upper conductive surface 204 of the sensor capacitor may be formed on the contact zone cavity 202 (e.g., by painting a conductive material on the contact zone cavity 202 when the top plate 102 is made of a non-conductive material). A top cavity 206 (e.g., which may be located at a center of the bottom surface of the top plate 102 of FIG. 1) may have enough room to accommodate a circuitry 306 (e.g., which may include a sensor module, a comparison module, a capacitance-to-frequency converter module, a capacitance-to-voltage module, an aggregation module, an alarm module, and/or a data processing module) coupled to the PCB 302 of FIG. 3. A sensor fastener chamber 208 may provide a space for a fastener (e.g., a fastener 300 of FIG. 3) to affix the top plate 102 and the bottom plate 104 of FIG. 1. A stress relief cavity 210 may provide a space for the stress relief 112 to fit in to the bottom plate 104 of FIG. 1.

FIGS. 3A and 3B are exploded views of a fastener 300 and a PCB 302 which sits on a bottom cavity 402 of FIG. 4, according to one embodiment. FIG. 3A is an exploded view of a fastener 300. In example embodiment, the fastener 300 (e.g., threaded or unthreaded) may affix the PCB 302 to the bottom plate 104 of FIG. 1 through a PCB fastener hole 310 to a PCB fastener chamber 406 of FIG. 4.

FIG. 3B is an exploded view of the PCB 302 (e.g., which may consist of a single PCB) which includes the lower conductive surface 304, a circuitry 306, and the upper reference surface 308, and the PCB fastener hole 310. The lower conductive surface 304 may be painted (e.g., sputtered, coated, etc.) on an upper surface of the PCB 302. The figure illustrates a multiple number (e.g., three) of lower conductive surfaces 304A-N painted (e.g., sputtered, coated, etc.) on the PCB 302. Each of the lower conductive surfaces 304A-N may be combined with each of the upper conductive surfaces 204A-N of FIG. 2 to form a sensor capacitor. A gap (e.g., of approximately 2/1000 inch) between the upper conductive surface 204 and the lower conductive surface 304 may be filled with a dielectric material (e.g., which may be solid, liquid, and/or gas where air is a convenient, easy to use dielectric).

The PCB 302 may be designed to fit the bottom cavity 402 of FIG. 4 so that the PCB may be isolated (e.g., protected) from a force applied on the multi-zone capacitive force-measuring device 100 of FIG. 1. A rear extension of the PCB 302 may be varied (e.g., shortened, extended, etc.) in size depending on a type of interface between the circuitry 306 and a communication device (e.g., a USB, a cable, a communication module, etc.). The circuitry 306 may be an electronic circuitry to perform various functions (e.g., to measure, convert, compare, add, communicate, process, and/or generate a signal data).

The upper reference surface 308 may be painted (e.g., sputtered, coated, etc.) on a bottom surface of the PCB 302. The upper reference surface 308 may be combined with the lower reference surface 404 of FIG. 4 to form a reference capacitor. A gap (e.g., approximately 2/1000 inch) between the upper reference surface 308 and the lower reference surface 404 may be filled with a dielectric material (e.g., which may be solid, liquid, and/or gas solid, liquid, and/or gas where air is a convenient, easy to use dielectric).

FIG. 4 is a three-dimensional view of the bottom plate 104 of FIG. 1 having the lower reference surface 404, according to one embodiment. The bottom plate 104 includes the bottom cavity 402, the lower reference surface 404, the PCB fastener chamber 406, a clamp 408, and a sensor fastener 410. The bottom cavity 402 (e.g., which may take a distinct shape to accommodate the PCB 302 of FIG. 3) may provide a space for the PCB 302. The lower reference surface 404 may combine with the upper reference surface 308 of FIG. 3 to form a reference capacitor (e.g., to compensate an error in the measurement due to an environmental condition such as humidity, temperature, etc.). A gap between the upper reference surface 308 and the lower reference surface 404 may be filled with a dielectric material (e.g., which may be solid, liquid, and/or gas solid, liquid, and/or gas where air is a convenient, easy to use dielectric).

The PCB fastener chamber 406 (e.g., threaded or unthreaded) may provide a space for a fastener (e.g., the fastener 300 of FIG. 3) to affix the PCB 302 and the bottom plate 104 of FIG. 1. The clamp 408 may be used to hold and/or secure the cable 110 of FIG. 1 which may be coupled to the circuitry 306 through a rear area of the PCB 302. The stress relief 112 of FIG. 1 may be used to promote longevity of the cable 110 by absorbing a stress (e.g., shock, strain, etc.) applied on the cable 110.

Figure 5A:
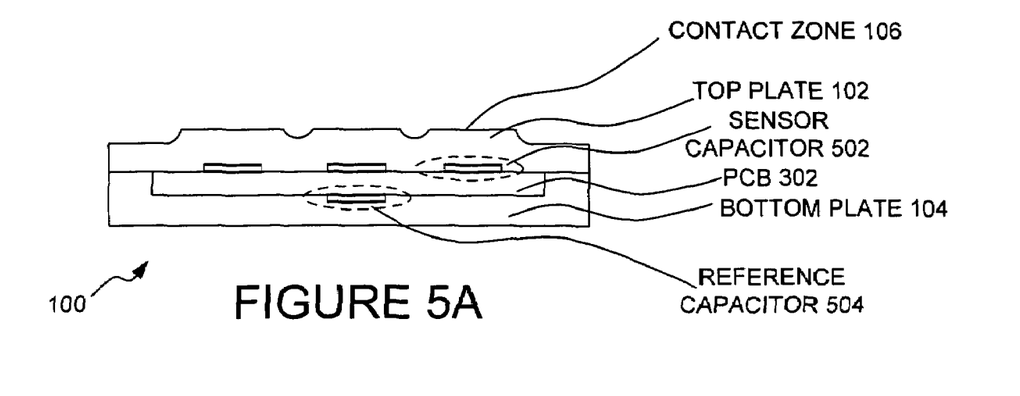
FIGS. 5A-C are cross sectional views of the multi-zone capacitive force-measuring device of FIG. 1 having multiple sensor capacitors and a reference capacitor, according to one embodiment.
Figure 5B:
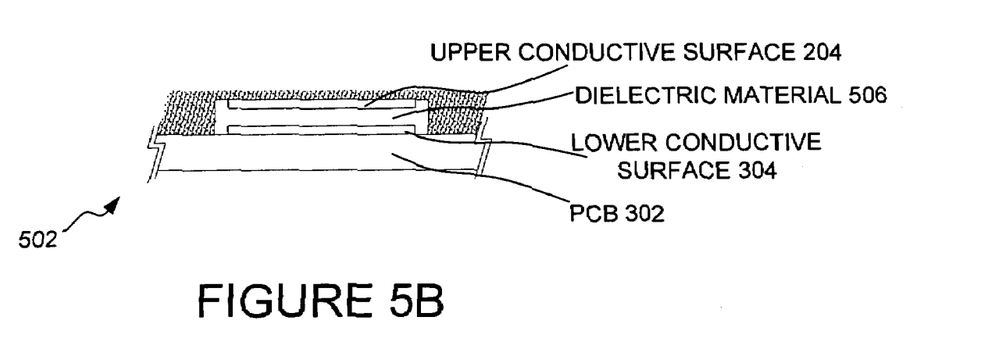
Figure 5C:
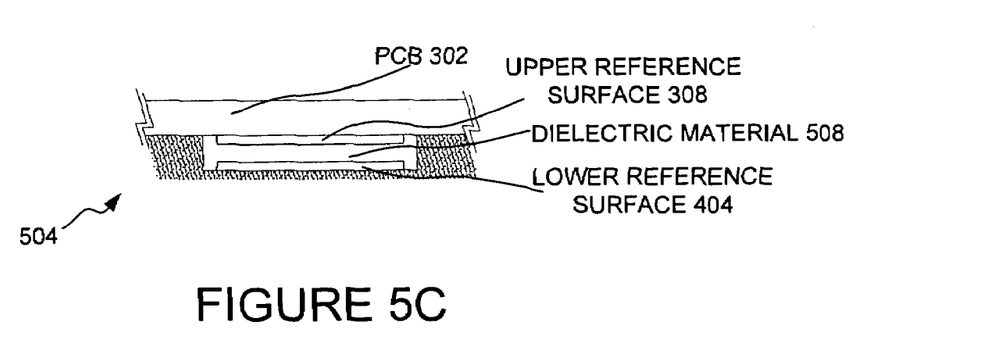

FIGS. 5A-C are cross sectional views of the multi-zone capacitive force-measuring device 100 of FIG. 1 having multiple sensor capacitors 502 and a reference capacitor 504, according to one embodiment. FIG. 5A is a cross sectional view of the multi-zone capacitive force-measuring device 100 which includes the top plate 102, the bottom plate 104, and the contact zone 106 of FIG. 1, the PCB 302 of FIG. 3, a sensor capacitor 502, and a reference capacitor 504, according to one embodiment. In one example, multiple number of sensor capacitors 502 may be based on a plurality of cavities created on a bottom surface of the top plate 102 where each of the cavities is directly below the contact zone 106 located on a top surface of the top plate 102. In another example, a reference capacitor 504 may be based on a cavity created on a top surface of the bottom plate 104 where the cavity is directly below the upper reference surface 308 of FIG. 3.

FIG. 5B is an exploded view of the sensor capacitor 502 which includes the upper conductive surface 204 of FIG. 2, the PCB 302, and the lower conductive surface 304 of FIG. 3, and a dielectric material 506. The upper conductive surface 204 may be an indented surface (e.g., of approximately 2/1000 inch in depth) of the bottom surface of the top plate 102. The upper conductive surface 204 may be painted (e.g., sputtered, coated, etc.) with a conductive material (e.g., of metal, metal alloy, etc.) when the top plate 102 of the multi-zone capacitive force-measuring device 100 of FIG. 1 is made of a non-conductive material. A cross sectional view of the indented surface may be a shape (e.g., a rectangle with its length longer than the length of the lower conductive surface 304 of FIG. 3 as illustrated in FIG. 5B) to prevent the bottom surface of the top plate 102 from coming in contact with the lower conductive surface 304 of FIG. 3 (e.g., thus preventing a short circuit between the upper conductive surface 204 and the lower conductive surface 304).

The lower conductive surface 304 may be painted (e.g., sputtered, coated, etc.) on a top surface of the PCB 302, and a dielectric material 506 (e.g., which may be solid, liquid, or gas where solid dielectrics solid, liquid, and/or gas where air is a convenient, easy to use dielectric) may be inserted between the upper conductive surface 204 of FIG. 2 and the lower conductive surface 304 of FIG. 3. In one example embodiment, the upper conductive surface 204 may be pressed down toward the lower conductive surface 304 (e.g., producing a shorter distance between the upper conductive surface 204 and the lower conductive surface 304) thus creating a change in capacitance when a force is applied on the contact zone 106 of the top plate 102 of FIG. 1.

FIG. 5C is an exploded view of the reference capacitor 504 which includes the PCB 302 and the upper reference surface 308 of FIG. 3, the lower reference surface 404 of FIG. 4, and a dielectric material 508. The lower reference surface 404 may be an indented surface (e.g., of approximately ²⁄1000 inch in depth) of a top surface of the bottom plate 104. The lower reference surface 404 may be painted (e.g., sputtered, coated, etc.) with a conductive material (e.g., of metal, metal alloy, etc.) when the bottom plate 104 of the multi-zone capacitive force-measuring device 100 of FIG. 1 is made of a non-conductive material. A cross sectional view of the indented surface may be a shape (e.g., a rectangle with its length longer than the length of the upper reference surface 308 of FIG. 3, etc.) to prevent the top surface of the bottom plate 104 from coming in contact with the upper reference surface 308 of FIG. 3 (e.g., thus preventing a short circuit between the upper reference surface 308 and the lower reference surface 404).

The upper reference surface 308 may be painted (e.g., sputtered, coated, etc.) on a bottom surface of the PCB 302, and a dielectric material 508 (e.g., which may be solid, liquid, or gas where solid dielectrics, solid, liquid, and/or gas where air is a convenient, easy to use dielectric) may be inserted between the upper reference surface 308 of FIG. 3 and the lower reference surface 404 of FIG. 4.

Figure 6:
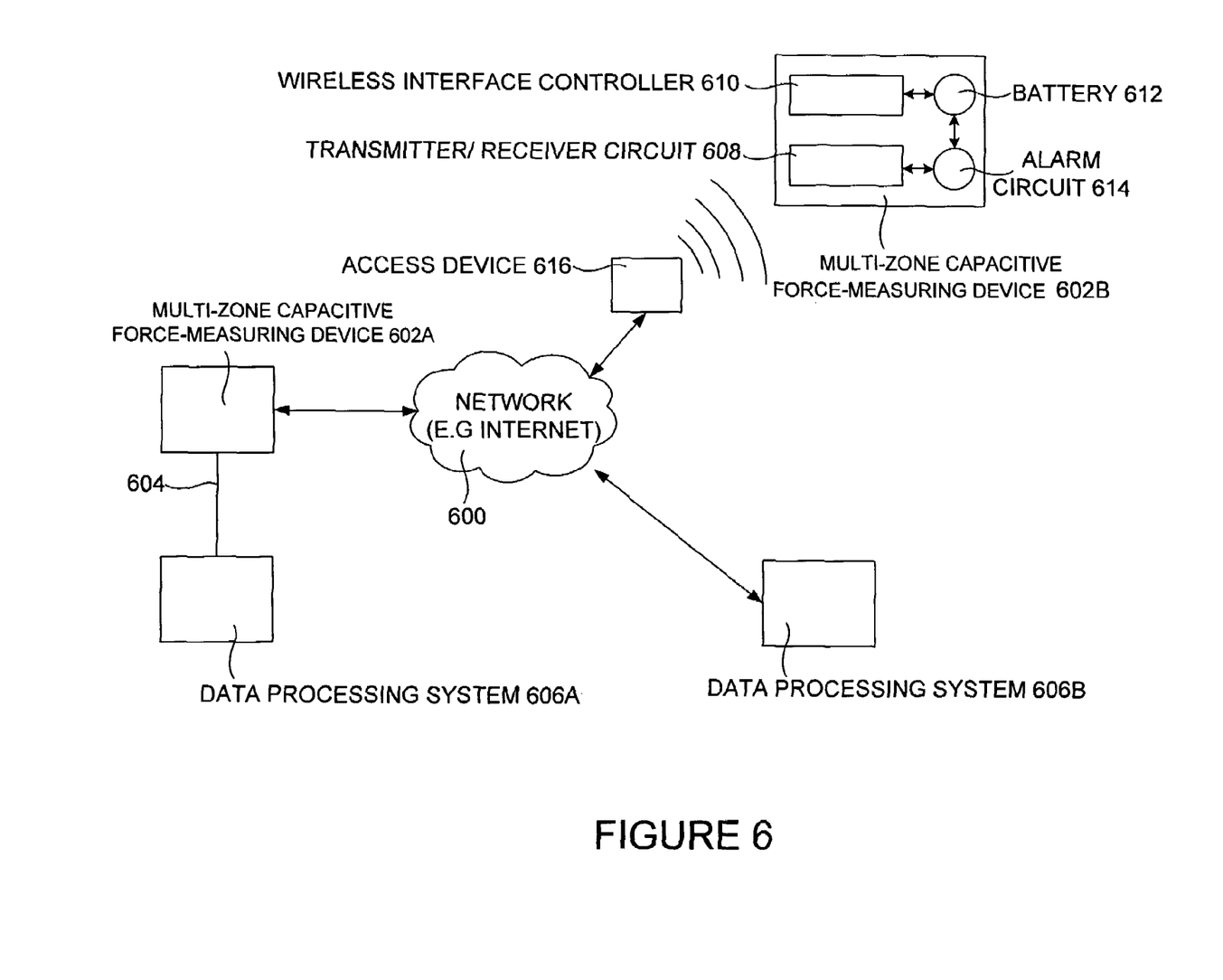
FIG. 6 is a network enabled view of a multi-zone capacitive force-measuring device, according to one embodiment.

FIG. 6 is a network enabled view of a multi-zone capacitive force-measuring device 602, according to one embodiment. The multi-zone capacitive force-measuring device 602A is connected to a data processing system 606A through a cable 604 as illustrated in FIG. 6. The multi-zone capacitive force-measuring device 602A is also connected to a network 600 (e.g., an internet, a local area network, etc.). The multi-zone capacitive force-measuring device 602B is wirelessly connected to the network 600 through an access device 616 (e.g., a device which enables wireless communication between devices forming a wireless network).

The multi-zone capacitive force-measuring device 602B includes a transmitter/receiver circuit 608 and a wireless interface controller 610 (e.g., for wireless communication), a battery 612 (e.g., to sustain as a standalone device), and an alarm circuit 614 (e.g., to alert a user when a force to the multiple-zone capacitive force-measuring device 602B is greater than a threshold value and/or when the battery is almost out). The transmitter/receiver circuit 608 and/or the wireless interface controller 610 may be integrated into the processing module 720 of FIG. 7.

A data processing system 606 may receive data (e.g., output data measuring a force and/or a load, etc.) from the multi-zone capacitive force-measuring device 602A and/or the multi-zone capacitive force-measuring device 602B through the network 600. In one embodiment, the data processing system 606 analyzes data (e.g., measurements) generated by various operation of the multi-zone capacitive force-measuring device 602. In another example embodiment, a universal serial bus (USB) may be included in the circuitry 306 of FIG. 3 of the multi-zone capacitive force-measuring device 602A and/or the multi-zone capacitive force-measuring device 602B. The USB (e.g., a USB port or hub with mini sockets) may allow a hardware interface (e.g., user-friendly) for a data processing system (e.g., the data processing system 606A and/or the data processing system 606B) and/or a hardware interface for attaching peripheral devices (e.g., a flash drive).

Figure 7:
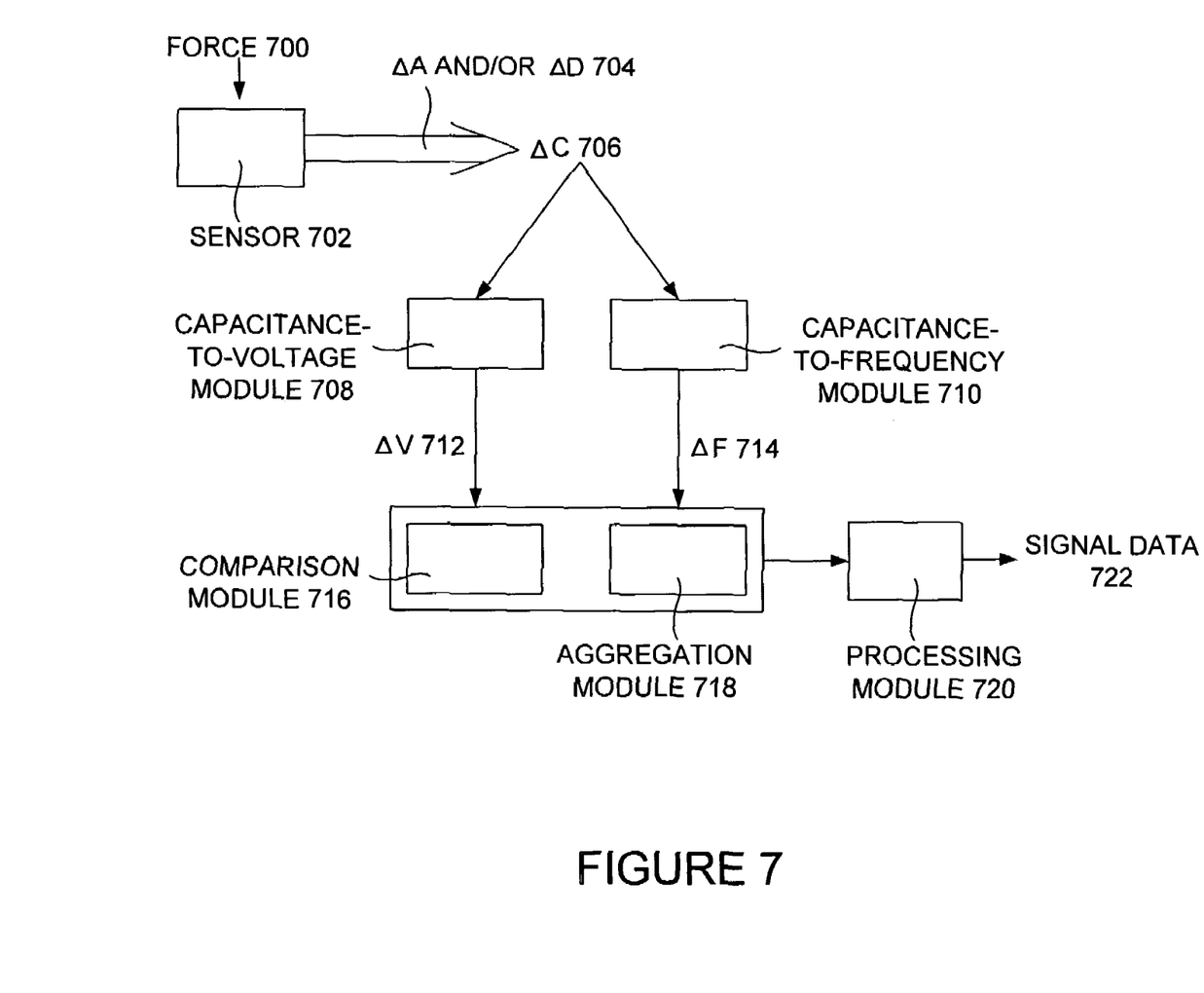
FIG. 7 is a process view of measuring a force, according to one embodiment.

FIG. 7 is a process view of measuring a force 700, according to one embodiment. In FIG. 7, an electronic circuitry (e.g., a software and/or hardware code) may apply an algorithm to measure a change in a distance 704 between two conductive plates (e.g., the upper conductive surface 204 of FIG. 2 and the lower conductive surface 304 of FIG. 3) of the sensor 702 (e.g., the sensor capacitor 502 of FIG. 5) when the force 700 is propagated to the sensor 702 (e.g., via the multi-zone capacitive force-measuring device 100).

In an alternate embodiment, a change in area between the plates may be considered rather than the change in the distance.

Next, a change in capacitance 706 may be calculated based on the change in the distance 704 between the two plates forming the sensor capacitor. The change in capacitance 706, a change in voltage 712, and/or a change in frequency 714 may also be calculated to generate a measurement (e.g., an estimation of the force 700 applied to the sensor 702). The change in capacitance 706 may be changed into the change in voltage 712 using a capacitance-to-voltage module 708. The change in capacitance 706 may also be converted into the change in frequency 714 using a capacitance-to-frequency module 710.

Furthermore, the capacitance-to-frequency module 710 may be based on a circuit which produces a wave data with a frequency proportional to the change in capacitance 706. Thus, a higher resolution of the measurement may be possible when the frequency results in a high value (e.g., in million cycles per second) and/or is modulated to the high value. For example, a frequency with 1 million cycles per second (Hz) would have 20 times higher resolution than a voltage with 5000 steps (e.g., measuring a voltage having a maximum 5 volts max in steps of millivolt). Here, an error for the frequency with 1 million Hz may be ¹⁄1,000,000, whereas an error for the voltage may be ¹⁄5000. Thus, one may be able to obtain the change in frequency 714 of the sensor 702 by subtracting a number of wave forms per second when there is no force present from a number of wave forms per second when the force 700 is applied on the sensor 702.

The change in voltage 712 and/or the change in frequency 714 of the sensor 702 (e.g., the sensor capacitor 502 of FIG. 5) may be provided to a comparison module 716 to compare with the change in voltage 712 and/or the change in frequency 714 of another sensor in the multi-zone capacitive force-measuring device 100 of FIG. 1 (e.g., having a plurality of the sensor 702). When any significant difference between measurements of the two sensors is detected, the comparison module 716 may generate a data indicating unevenness of a force applied on the multi-zone capacitive force-measuring device 100 of FIG. 1. Moreover, an alarm module (e.g., the alarm circuit 614 of FIG. 6) may express a sensory data (e.g., based on a sound, a feel, a visual, a smell, and/or etc.) when a parameter of the data (e.g., of the comparison module 716) exceeds a threshold value.

Furthermore, an aggregation module 718 may be used to sum up the measurement (e.g., in capacitance, voltage, and/or frequency) of each of the sensor 700. Lastly, a processing module 720 (e.g., a microprocessor which may be integrated in the circuitry 306 of the PCB 302 of FIG. 3 to analyze and/or process the change in capacitance 706, the change in voltage 712, and/or the change in frequency 714) may produce a signal data 722 in a form of an aggregated measurement (e.g., based on a calculation done in the aggregation module 718) and/or of a status indicator (e.g., based on an analysis done in the comparison module 716) determining a levelness of a load applied on the multi-zone capacitive force-measuring device 100 of FIG. 1.

In addition, the processing module 720 may encompass a communication module (e.g., which includes the transmitter/receiver circuit 608 of FIG. 6 and/or the wireless interface controller 610 of FIG. 6) and/or a data processing module (e.g., the data processing system 606).

Figure 8A:
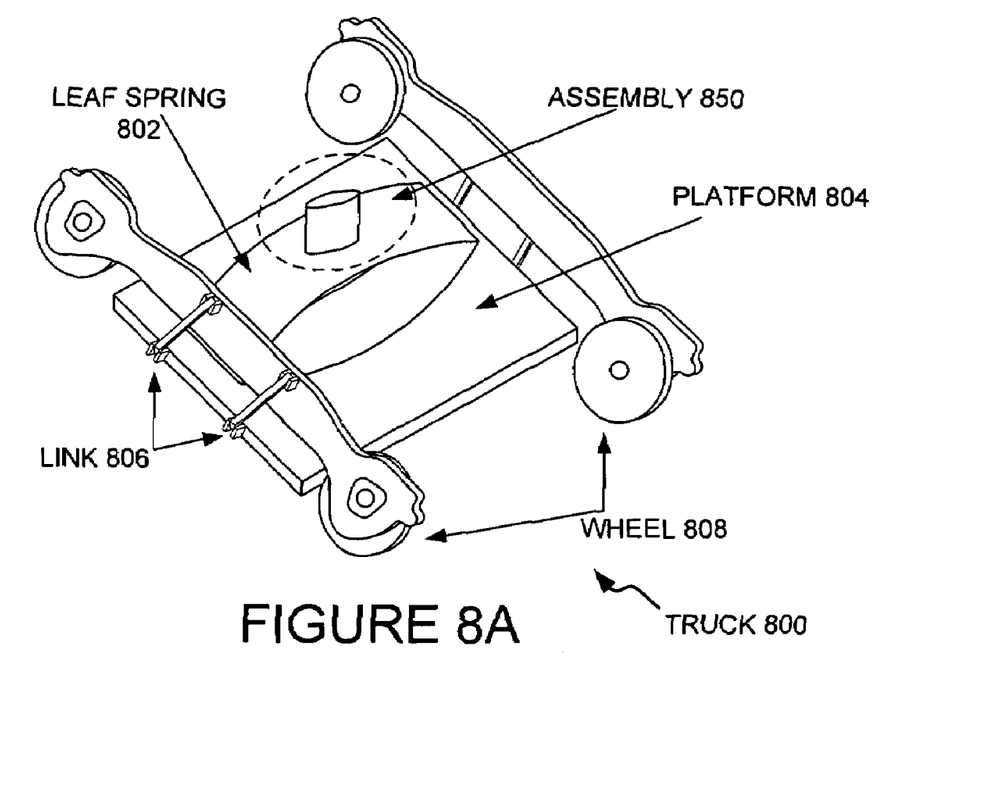
FIGS. 8A and 8B are a three dimensional view of a truck having an assembly and an exploded view of the assembly, respectively, according to one embodiment.
Figure 8B:
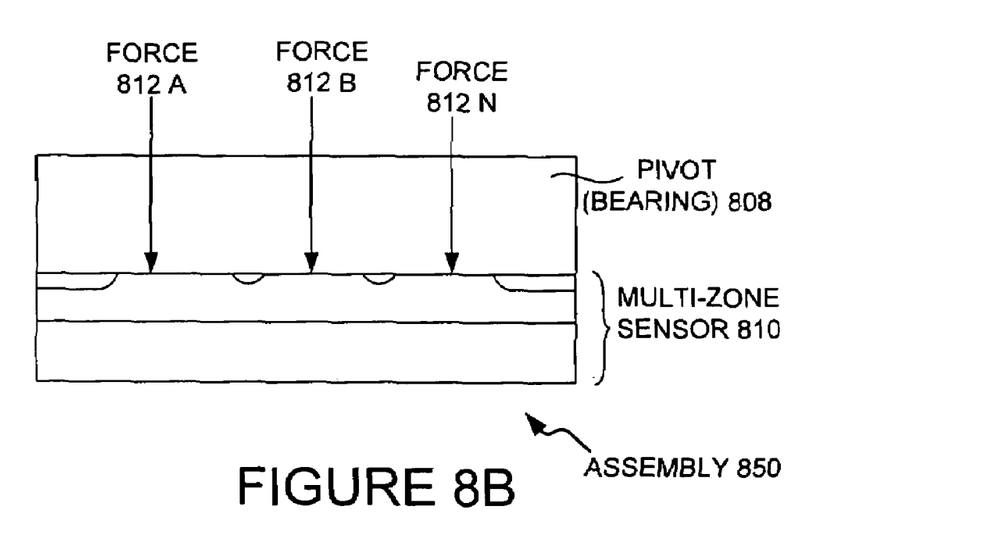

FIGS. 8A and 8B are a three dimensional view of a truck 800 having an assembly 850 and an exploded view of the assembly 850, according to one embodiment. The truck 800 may include a leaf spring 802, a platform 804, a link 806, a pivot 808 (e.g., fixed and/or movable pivot), and the assembly 850. The truck 800 may provide a suspension for a vehicle (e.g., a locomotive, a minivan, a railcar, a carriage, etc.). The truck's weight may rest on the assembly 850 (e.g., which includes a pivot 808 made of a bearing and/or a multi-zone sensor 810 of FIG. 8B). The assembly 850 may allow the truck 800 to pivot so the truck may make a turn. The assembly 850 may also generate a signal data when there is a malfunction with the assembly 850. Below the assembly 850 is the leaf spring 802 that rest on the platform 804. The platform 804 may be suspended by four links 806 (e.g., made of metal) which connect to the truck 800. The links 806 may allow the truck 800 to swing from side to side.

For example, a railcar operator (e.g., Amtrack™) may wish to ensure that a load (e.g., cargo) is distributed properly on bearings that support the load on a railcar (e.g., there may be a government regulation to ensure that the bearings supporting a load are functioning properly). A sensor such as the embodiments described herein may be used on each corner (e.g., four corners) of a rail car to ensure that the load is properly supported (e.g., not inclined).

FIG. 8B is an exploded view of the assembly 850 which includes the pivot 808 with a bearing placed on top of the multi-zone sensor 810 (e.g., the multi-zone capacitive force-measuring device 100 of FIG. 1). Forces 812A-N may be applied to the multi-zone sensor 810 when a weight of the truck 800 is applied on the pivot 808 of the assembly 850. When a force (e.g., a force 812N) substantially less than other forces (e.g., a force 812A and a force 812B) being applied on the multi-zone sensor 810 is applied on a contact zone of the multi-zone sensor 810, a degree of deflection of the contact zone associated with the force may be less than other contact zones (e.g., which come in contact with the force 812A and/or the force 812B) of the multi-zone sensor 810.

A comparison module (e.g., the comparison module 716 of FIG. 7) may detect the difference and/or generate a data indicating the difference. When the data is relayed to an alarm module (e.g., the alarm circuit 614 of FIG. 6), the alarm module may generate a sensory data (e.g., a beep, a flash, etc.) to alert. The signal data may also be wirelessly communicated to a data processing system (e.g., a remote station) to report any potential danger the truck 800 may be facing. The multi-zone sensor 810 may be equipped with a battery (e.g., the battery 612 of FIG. 6) to stand on its own and/or charged by an energy source of the truck 800.

Figure 9:
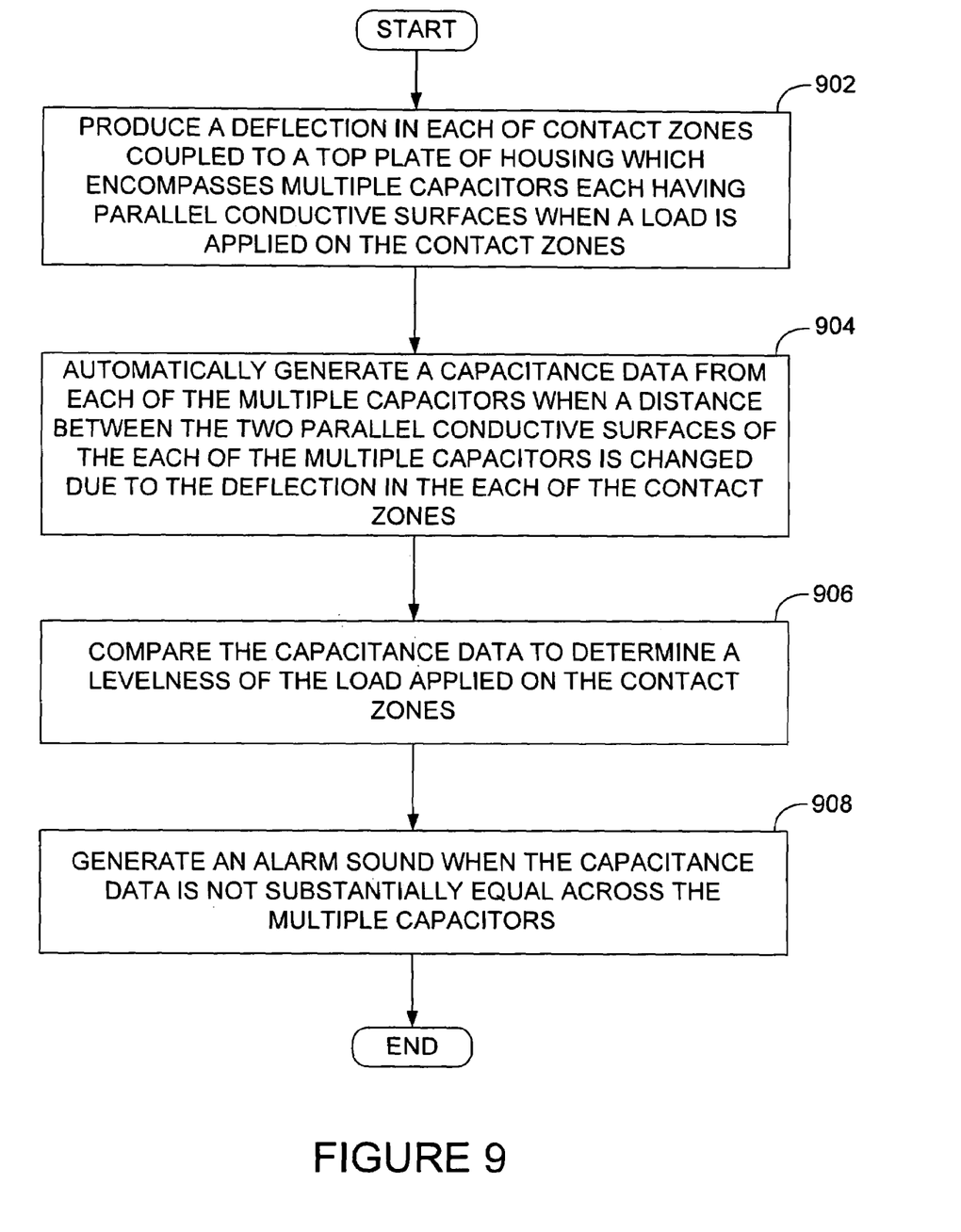
FIG. 9 is a process flow of determining a levelness of a load applied on the multi-zone capacitive force-measuring device of FIG. 1, according to one embodiment.

FIG. 9 is a process flow of determining a levelness of a load applied on the multi-zone capacitive force-measuring device 100 of FIG. 1, according to one embodiment. In operation 902, a deflection may be produced in each of contact zones coupled to a top plate of a housing which encompasses multiple capacitors each having two parallel conductive surfaces (e.g., the upper conductive surface 204 of FIG. 2 and the lower conductive surface 304 of FIG. 3) when a load (e.g., a pressure, a force applied by the load, etc.) is applied on the contact zones. A capacitance data may be automatically generated from each of the multiple capacitors in operation 904 when a distance between the two parallel conductive surfaces of each of the multiple capacitors is changed (e.g., to a shorter distance) due to the deflection in the each of contact zones.

In operation 906, the capacitance data may be compared (e.g., between the multiple capacitors) to determine a levelness of the load applied on the contact zones. For example, when a capacitance data generated by a capacitor A in a multi-zone capacitive force-measuring device (e.g., the multi-zone capacitive force-measuring device 100 of FIG. 1) is significantly less or more than another capacitance data generated by any capacitor in the multi-zone capacitive force-measuring device, a load responsible for the capacitance data may be determined to be uneven. In operation 908, an alarm sound (e.g., and/or other sensory data) may be generated when the capacitance data is not substantially equal across the multiple capacitors (e.g., of the multi-zone capacitive force-measuring device 100 of FIG. 1).

Figure 10:
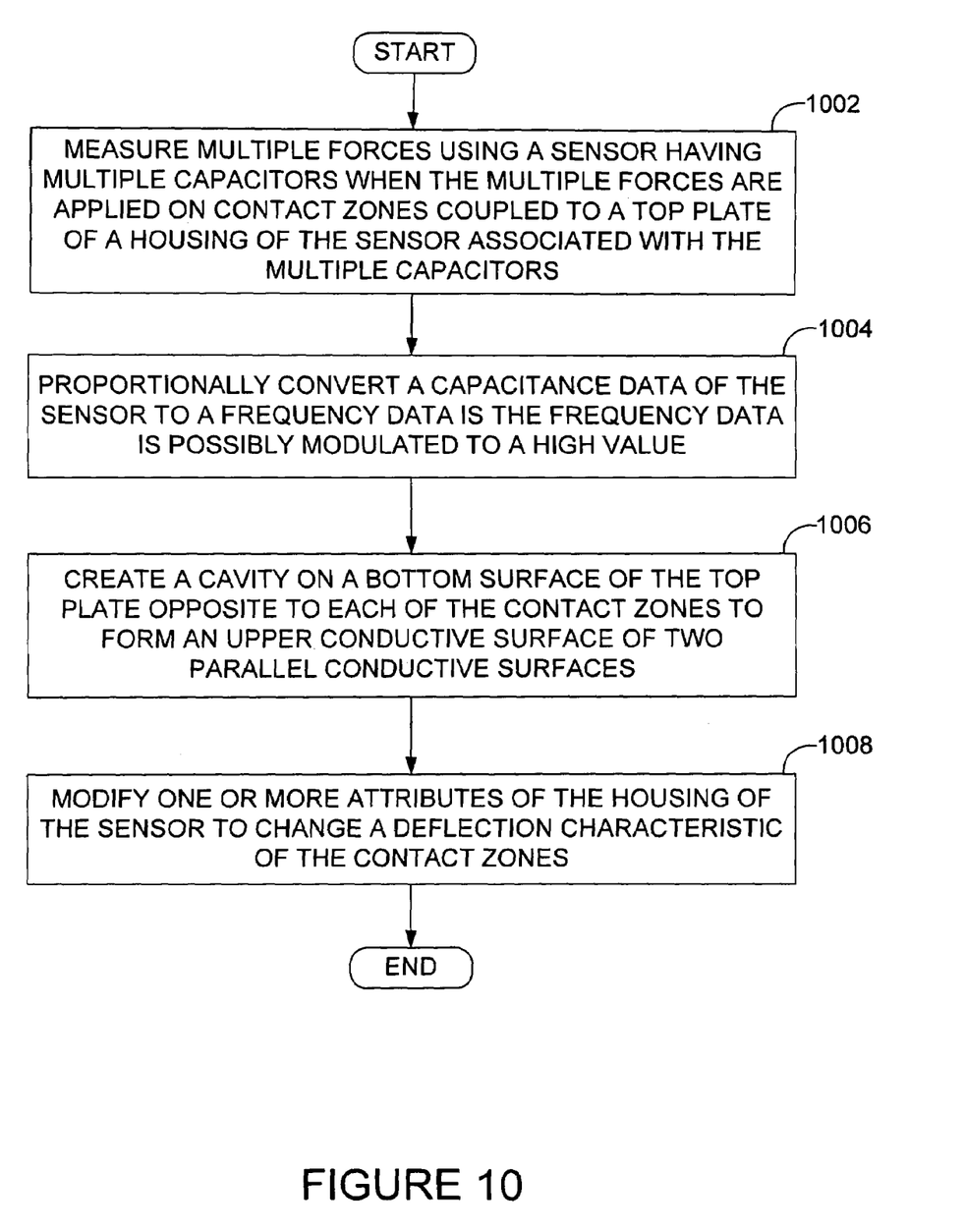
FIG. 10 is a process flow of manipulating a measurement characteristic of the multi-zone capacitive force-measuring device of FIG. 1, according to one embodiment.

FIG. 10 is a process flow of manipulating a measurement characteristic of the multi-zone capacitive force-measuring device 100 of FIG. 1, according to one embodiment. In operation 1002, multiple forces may be measured using a sensor (e.g., in the multi-zone capacitive force-measuring device 100 having multiple capacitors) when the multiple forces are applied on contact zones (e.g., associated with the multiple capacitors) coupled to a top plate of a housing of the sensor.

Measurements of the multiple forces may be summed up (e.g., added, aggregated, etc.) using a module (e.g., an aggregation module 718 of FIG. 7) to measure a total weight of a load applied on the sensor. A capacitance data of the sensor may be proportionally converted to a frequency data in operation 1004 where the frequency data is possibly modulated to a high value (e.g., to give a higher resolution of the frequency data thereby minimizing an error in processing the frequency data).

In operation 1006, a cavity (e.g., approximately $2/1000$ inch) may be created on a bottom surface of the top plate (e.g., the top plate 102 of FIG. 1) opposite to each of the contact zones to form an upper conductive surface (e.g., the upper conductive surface 204 of FIG. 2) of two parallel conductive surfaces of the sensor. The cavity will form a sensor capacitor (e.g., the sensor capacitor 502 of FIG. 5) when it combines with a lower conductive surface (e.g., the lower conductive surface 304 of FIG. 2).

In operation 1008, one or more attributes of the housing of the sensor may be modified to change a deflection characteristic of the contact zones (e.g., which may allow more change in a distance between two parallel conductive surfaces of each of the multiple capacitors). The deflection characteristic of the contact zones may be determined by a number of factors (e.g., depending on a type of material used for the contact zones, a size of the contact zones, a geometry of the contact zones, and/or force applied on the contact zones). The number of factors may be used in part or in whole to provide a low resistance to the deflection of the contact zones, thereby allowing the contact zones to bend more readily. On the contrary, the number of factors may be used in part or in whole to provide a high resistance to the deflection of the contact zones, thereby causing the contact zones to respond to a load being applied in more rigid manner.

In another embodiment, a depth of the cavity (e.g., the contact zone cavity 202 of FIG. 2) may be varied to change the deflection characteristic of the contact zone. For example, the cavity formed on a bottom surface of the top plate 102 of FIG. 1 (e.g., which corresponds to a contact zone) becomes larger, the thickness of the contact zone (e.g., the contact zone 106 of FIG. 1) may decrease (e.g., thus becoming less resistant to bending due to a load applied on the contact zone).

Although the present embodiments have been described with reference to specific example embodiments, it will be evident that various modifications and changes may be made to these embodiments without departing from the broader spirit and scope of the various embodiments. For example, the circuitry 306 of FIG. 3, the transmitter/receiver circuit 608, the wireless interface controller 610 and the alarm circuit 614 of FIG. 6, and/or the capacitance-to-voltage module 708, the capacitance-to-frequency module 710, the comparison module 716, aggregation module 718 and the processing module 720 of FIG. 7, described herein may be enabled and operated using hardware circuitry (e.g., CMOS based logic circuitry), firmware, software and/or any combination of hardware, firmware, and/or software (e.g., embodied in a machine readable medium).

For example, the capacitance-to-voltage module 708, the capacitance-to-frequency module 710, the comparison module 716, aggregation module 718 and/or the processing module 720 may be enabled using software and/or using transistors, logic gates, and electrical circuits (e.g., application specific integrated ASIC circuitry) such as a converter circuit, an aggregation circuit, and/or a processing circuit. In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. An apparatus comprising:
a plurality of capacitors each having an upper conductive surface and a lower conductive surface substantially parallel to the upper conductive surface;
a housing with a top plate and a bottom plate to encompass the plurality of capacitors;
a sensor in the housing to generate a measurement based on a change in a distance between the upper conductive surface and the lower conductive surface of each of the plurality of capacitors when a contact zone of the top plate associated with the each of the plurality of capacitors is deflected by a force applied on the contact zone;
a reference capacitor having an upper reference surface and a lower reference surface in the housing to compensate an error in the measurement based on an environmental condition; and
at least one contact zone cavity formed on a bottom surface of the top plate, and wherein the upper conductive surface is formed on each of the at least one contact zone cavity.

2. The apparatus of claim 1 further comprising at least one bottom cavity formed on a top surface of the bottom plate, and wherein the lower reference surface is formed on each of the at least one bottom cavity.

3. The apparatus of claim 2 wherein the at least one contact zone cavity and the at least one bottom cavity are approximately 2/1000 inch in depth.

4. The apparatus of claim 3 further comprising a single printed circuit board to accommodate the sensor and a plurality of circuits associated with the sensor and to provide the lower conductive surface of the each of the plurality of capacitors and the upper reference surface of the reference capacitor.

5. The apparatus of claim 1 further comprising a comparison module associated with the sensor to generate a signal data indicating unevenness of a force applied on the top plate when there is any significant difference between measurements of the plurality of capacitors.

6. The apparatus of claim 5 further comprising an alarm module associated with the sensor to express a sensory data when a parameter of the signal data exceeds a threshold value.

7. The apparatus of claim 1 further comprising an aggregation module associated with the sensor to sum up the measurement of the each of the plurality of capacitors.

8. The apparatus of claim 1 further comprising a capacitance-to-frequency converter module associated with the sensor to convert the measurement to a frequency value.

9. The apparatus of claim 1 further comprising a communication module and a data processing module associated with the sensor to interface with a communication device.

10. The apparatus of claim 1 wherein the housing comprises three capacitors to form a three zone sensor to generate the measurement associated with at least one of the three capacitors.

11. A method, comprising:
producing a deflection in each of a plurality of contact zones coupled to a top plate of a housing which encompasses a plurality of capacitors each having two parallel conductive surfaces when a load is applied on the plurality of contact zones;
automatically generating a capacitance data from each of the plurality of capacitors when a distance between the two parallel conductive surfaces of the each of the plurality of capacitors is changed due to the deflection in the each of the plurality of contact zones; and
modifying at least one attribute of the housing to change a deflection characteristic of the contact zones.

12. The method of claim 11 further comprising proportionally converting the capacitance data to a frequency data wherein the frequency data is possibly modulated to a high value.

13. The method of claim 11 further comprising comparing the capacitance data to determine a levelness of the load applied on the plurality of contact zones.

14. The method of claim 13 further comprising generating an alarm sound when the capacitance data is not substantially equal across the plurality of capacitors.

15. The method of claim 11 further comprising measuring a plurality of forces using a sensor having the plurality of capacitors when the plurality of forces are applied on the plurality of contact zones.

16. The method of claim 11 further comprising creating a cavity on a bottom surface of the top plate opposite to each of the plurality of contact zones to form an upper conductive surface of the two parallel conductive surfaces.

17. A method in a form of a machine-readable medium embodying a set of instructions that, when executed by a machine, cause the machine to perform a method comprising:
producing a deflection in each of a plurality of contact zones coupled to a top plate of a housing which encompasses a plurality of capacitors each having two parallel conductive surfaces when a load is applied on the plurality of contact zones; and
automatically generating a capacitance data from each of the plurality of capacitors when a distance between the two parallel conductive surfaces of the each of the plurality of capacitors is changed due to the deflection in the each of the plurality of contact zones; and
modifying at least one attribute of the housing to change a deflection characteristic of the contact zones.

18. An apparatus comprising:
a plurality of capacitors each having an upper conductive surface and a lower conductive surface substantially parallel to the upper conductive surface;
a housing with a top plate and a bottom plate to encompass the plurality of capacitors;

a sensor in the housing to generate a measurement based on a change in a distance between the upper conductive surface and the lower conductive surface of each of the plurality of capacitors when a contact zone of the top plate associated with the each of the plurality of capacitors is deflected by a force applied on the contact zone;

a comparison module associated with the sensor to generate a signal data indicating unevenness of a force applied on the top plate when there is any significant difference between measurements of the plurality of capacitors; and an alarm module associated with the sensor to express a sensory data when a parameter of the signal data exceeds a threshold value.

19. An apparatus comprising:

a plurality of capacitors each having an upper conductive surface and a lower conductive surface substantially parallel to the upper conductive surface;

a housing with a top plate and a bottom plate to encompass the plurality of capacitors, wherein the housing comprises three capacitors to form a three zone sensor to generate the measurement associated with at least one of the three capacitors; and a sensor in the housing to generate a measurement based on a change in a distance between the upper conductive surface and the lower conductive surface of each of the plurality of capacitors when a contact zone of the top plate associated with the each of the plurality of capacitors is deflected by a force applied on the contact zone.

20. A method, comprising:

producing a deflection in each of a plurality of contact zones coupled to a top plate of a housing which encompasses a plurality of capacitors each having two parallel conductive surfaces when a load is applied on the plurality of contact zones;

automatically generating a capacitance data from each of the plurality of capacitors when a distance between the two parallel conductive surfaces of the each of the plurality of capacitors is changed due to the deflection in the each of the plurality of contact zones;

comparing the capacitance data to determine a levelness of the load applied on the plurality of contact zones; and generating an alarm sound when the capacitance data is not substantially equal across the plurality of capacitors.

21. A method, comprising:

producing a deflection in each of a plurality of contact zones coupled to a top plate of a housing which encompasses a plurality of capacitors each having two parallel conductive surfaces when a load is applied on the plurality of contact zones;

automatically generating a capacitance data from each of the plurality of capacitors when a distance between the two parallel conductive surfaces of the each of the plurality of capacitors is changed due to the deflection in the each of the plurality of contact zones; and creating a cavity on a bottom surface of the top plate opposite to each of the plurality of contact zones to form an upper conductive surface of the two parallel conductive surfaces.

* * * * *